United States Patent [19]

Maeda et al.

[11] Patent Number: 4,724,448
[45] Date of Patent: Feb. 9, 1988

[54] FIXED-FOCUS AMPHIBIOUS CAMERA

[75] Inventors: Keisuke Maeda, Sakai; Yoshinobu Kudo, Osaka, both of Japan

[73] Assignee: Minolta Camera Kabushiki Kaisha

[21] Appl. No.: 15,595

[22] Filed: Feb. 17, 1987

Related U.S. Application Data

[63] Continuation of Ser. No. 888,262, Jul. 18, 1986, abandoned, which is a continuation-in-part of Ser. No. 692,442, Jan. 17, 1985, abandoned.

[30] Foreign Application Priority Data

Jan. 17, 1984 [JP] Japan ................................. 59-6932

[51] Int. Cl.$^4$ .............................................. G03B 17/08
[52] U.S. Cl. ...................................................... 354/64
[58] Field of Search ............................ 354/64; 358/99; 350/575

[56] References Cited

U.S. PATENT DOCUMENTS

| | | | |
|---|---|---|---|
| 2,001,683 | 5/1935 | Jackman | 354/64 X |
| 2,169,874 | 8/1939 | Hardt | 350/575 |
| 3,320,018 | 5/1967 | Pepke | 354/64 |
| 3,788,730 | 1/1974 | Greenleaf | 354/64 |
| 4,100,553 | 7/1978 | Danel | 354/64 |
| 4,295,721 | 10/1981 | Rebikoff | 354/64 |

FOREIGN PATENT DOCUMENTS 47-42173 10/1972 Japan .

OTHER PUBLICATIONS

Neblette et al, Photographic Lenses, 1973, p. 69.

Primary Examiner—W. B. Perkey
Attorney, Agent, or Firm—Wolder, Gross & Yavner

[57] ABSTRACT

A fixed focus amphibian camera comprises a foremost element of a taking lens group on a water tight camera body. The foremost element has a concave shaped surface on its front side. When the camera is used in water the refractive power of the concave shaped surface is reduced due to the difference in the refractive index between water and air, so that the subject distance that can be focused is shortened in water than in air.

2 Claims, 4 Drawing Figures

FIXED-FOCUS AMPHIBIOUS CAMERA

This application is a continuation of application Ser. No. 888,262, filed July 18, 1986, now abandoned, which is a continuation of Ser. No. 692,442 filed Jan. 17, 1985, now abandoned.

BACKGROUND OF THE INVENTION

1. Field of the Invention

The present invention relates to the structure of a fixed-focus amphibious camera and, more particularly, to a camera capable of bringing any subject to be photographed into focus both on land and in water.

2. Description of the Prior Art

When photographs are taken in water, a camera specifically designed for use in water and having waterproof structure or a camera housed in a waterproof casing is used. However, many limitations are imposed on photographing in water, unlike photographing on land. First, light is attenuated by water, reducing the maximum object distance available. Even in water having a good transparency, the maximum object distance that can be achieved is as short as about 25 m. Also, as deeper it goes, made shorter the object distance. Further, if many objects or materials float in water, the distance is further reduced, and the contrast is lowered. In addition, water selectively absorbs light components of longer wavelengths, so that the light coming from a subject to be photographed is tinted blue. Furthermore, the light emitted from a subject located remotely becomes totally blue. Accordingly, when clear photographs are to be taken in water, the camera is urged to be set closer to the subject than on land. Thus, a predetermined object distance at which photographs are taken most frequently is of the order of 2 m on land, whereas, in water, the object distance is approximately 1.5 m and photographs are often taken even at still shorter distances. Underwater photographing often employs flashlight on account of low luminance of subjects to be photographed, but the flashlight is absorbed by water. For this reason, photographs must be taken at shorter object distances. Consequently, cameras for use in water are required to be so designed that subjects are brought to focus at shorter distances than on land. As such, a fixed-focus amphibious camera is so designed that for use on land, subjects are brought to focus at an object distance predetermined for photographing on land and for use in water, subjects are brought to focus at a shorter object distance predetermined for photographing in water. However, the prior art fixed-focus amphibious camera is so made that subjects are brought to focus at an object distance predetermined either for on land or in water resulting in a possibility that photographs are taken which are out of focus. For example, if a camera adapted to take photographs on land is used to take photographs in water, subjects are photographed at too short distances, resulting in photographs that are out of focus. In the reverse situation, photographs are taken at too large distance on land, producing photographs that are out of focus.

A camera which is so designed that a subject at a suitable distance is brought to focus in water is disclosed in U.S. Pat. No. 4470680. This camera is equipped with a device to sense whether it is on land or in water. When the camera is put into water, the object distance which is brought into focus is automatically switched to the value preset for photographing in water.

However, this camera requires a sensor device making use of photoelectric devices, for example, thus making the structure complicated. This increases the cost to manufacture the camera.

Another camera is disclosed in Japanese Patent Laid-open Publicity No. Sho. 54-85721, in which an attachment lens is installed in front of the lens system to permit any subject at the same distance to be brought to focus with exactly the same adjustment of focus whichever the camera is on land or in water. This camera utilizes the difference between the refraction of light occurring at the boundary between the lens and water and the refraction of light occurring at the boundary between the lens and air. The difference is caused by the difference between the indices of refraction of water and air. However, this camera is capable of adjusting focus. In water, the distance to the subject is actually measured with a metering device. The focus is made to conform with this measured value.

Although this technique using an attachment lens might be similarly adapted to a fixed focus camera, the result would be such that objects located at the same distance are brought into focus whether they are on land or in water, thus leaving the foregoing difficulties unsolved.

SUMMARY OF THE INVENTION

It is an object of the present invention to provide a fixed-focus amphibious camera which permits one to take sharply focused photographs without requiring special operations both in water and on land.

A fixed-focused amphibious camera according to the present invention is provided with a body formed by a watertight casing, in which main lenses for photographing are housed. Also installed in the casing is a transparent optical element which cooperates with the main lenses to form an optical system. The outer surface of the transparent element is shaped into a concave form. Thus, when the camera is placed in water, the difference between the indices of refraction of air and water reduces the negative power of the concave surface, shortening the total focal distance of the optical system. As a result, a subject is brought to focus at a shorter distance than the case where the camera is placed in air. Hence, the camera reduces a possibility that out-of-focus photographs are taken during underwater photographing that is often done at shorter distances.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENT

One embodiment of the present invention is hereinafter described with reference to the drawings.

Figure 1:
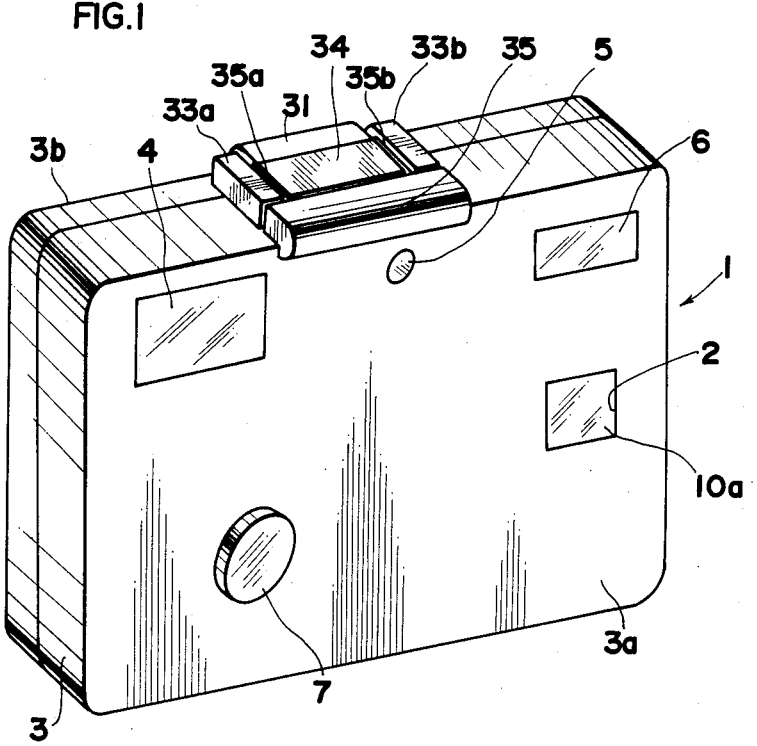
FIG. 1 is a perspective view of a camera according to an embodiment of the present invention.
Figure 3:
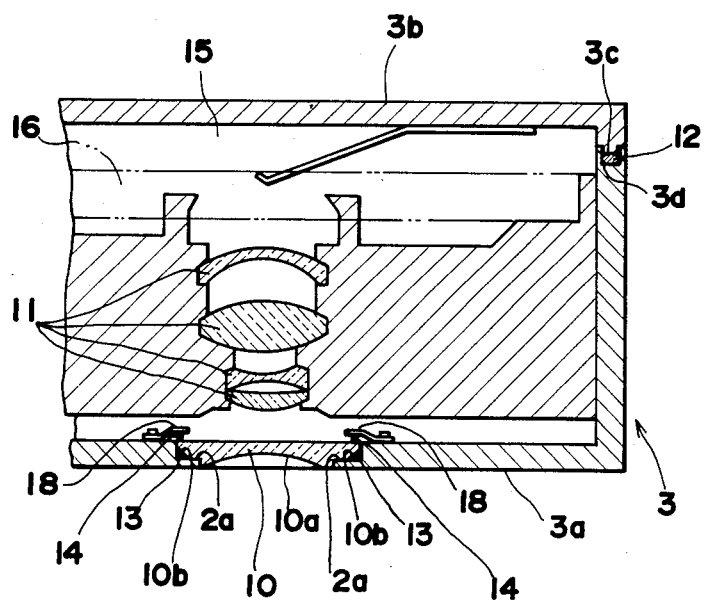
FIG. 3 is a cross-sectional view of the main portions of one example of the camera.

Referring to FIGS. 1 and 3, there is shown a camera according to the one embodiment of the invention, the camera using a disklike film cartridge as shown in U.S. Pat. No. 4,361,387. The camera 1 has a casing 3 that includes a front portion 3a and a rear cover 3b. The front portion 3a and the rear cover 3b are designed to be waterproof and combined into a watertight housing. As can be seen from the cross-sectional view of FIG. 3, at the coupled portion between the front portion 3a and the rear cover 3b, the front portion 3a is provided with a recess 3d over the whole periphery, and the rear cover 3b is provided with a protrusion 3c of the size to fit into the recess 3d. The front portion 3a and the cover 3b are combined into the housing in a watertight manner by inserting an O ring 12 between the recess 3d and the protrusion 3c and pressing them into engagement with each other.

The rear cover 3b is held by a shaft extending across the camera 1 horizontally in the lower portion of the camera, and the cover is rotatable about the front portion 3a. A film cartridge 16 can be removed and inserted by opening the cover 3b. The rear cover 3b is fixedly secured by a locking device to the front portion 3a in the upper portion of the camera 1 so that the cover cannot be opened.

Figure 2:
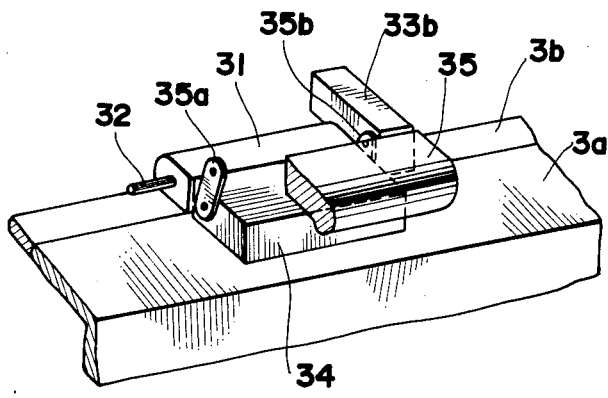
FIG. 2 is a partially cut-way perspective view of the camera.

As shown in FIGS. 1 and 2, the locking device by means of which the rear cover is locked is comprised of a base 34, legs 35a and 35b, arms 33a and 33b, an operation portion 35, and a stationary portion 31. All of these members are mounted to the front portion 3a of the camera 1 except for the stationary portion 31 mounted to the rear cover 3b. The base 34 is fixedly mounted to the upper surface of the front portion 3a. Disposed on opposite sides of the base 34 are the legs 35a and 35b which are rotatably held at rear positions in the camera. The arms 33a, 33b and the operation portion 35 are combined into a U-shaped structure. Each one end of the legs 35a and 35b is pivotally mounted to each inner surface of the arms 33a and 33b at front positions in the camera, i.e., near the operation portion. Hooked backle claws (not shown) are received in their respective arms 33a and 33b and biased toward the operation portion 35 by springs.

The stationary portion 31 is firmly mounted to the upper surface of the rear cover 3b. A pair of metal elements 32 extend from opposite side surfaces of the stationary portion 31 in the lateral direction of the camera. It is not to be noted that only one of the metal elements is shown in FIG. 2, which is a partially cutway view and in which the camera is shown under the unlocked condition. Under this condition, the operation portion 35 is first operated so that the backle claws (not shown) may be caught by the metal elements 32. Then, the operation portion 35 and the arms 33a, 33b are thrown down while maintaining the claws caught by the elements. The condition in which they have been fully thrown down is shown in FIG. 1. The biasing force of the springs causes the backle claws to pull the metal elements forwardly of the camera. The protrusion 3c on the rear cover 3b and the recess 3d in the front portion 3a are pressed against each other with the O ring 12 interposed therebetween.

Mounted on the front surface of the camera are a viewfinder window 6 located at the right upper corner as viewed from the front, a light-receiving window 5 used for a photometer and located near the center of the upper portion, a light-emitting portion 4 of an electronic flash device located at the left upper corner, and a shutter release button 7 located in the left lower portion. All of these members are designed to be watertight.

Formed close to the right end of the front surface of the camera is a taking lens window 2, which is a rectangular opening formed on the wall member constituting the front portion of the camera, as shown in FIG. 1. As can be seen from the cross-sectional view of FIG. 3, the opening is made smaller on the front side thereof than on the rear side thereof. The intermediate portion of the opening forms a step portion 2a that is substantially perpendicular to the front surface of the camera. A glass member 10 constituting a portion of the optical system for photographing is fitted into the window 2 from the inside. The peripheral portion of the glass member 10 on the front side is beveled to form a tapered portion 10b. An O ring 13 is sandwiched between the tilted portion 10b and the step portion 2a. A mounting member 18 is mounted by screws to the inner surface of the wall member in which the window 2 is formed. The mounting member 18 urges the glass member 10 forward via the resilient member 14, and presses the tilted portion 10b on the step portion 2a via the O ring 13 to keep the water-tight structure. The front surface 10a of the glass member 10 is concave.

A set of lenses which constitute the main elements 11 of the optical system for photographing is installed inside the camera at the rear of the glass member 10. This set of lenses cooperate with the glass member 10 to form a single optical system for photographing.

The cartridge for the disklike film is loaded in a chamber 15. The manner in which the film cartridge is loaded is indicated by the phantom line 16.

Figure 4:
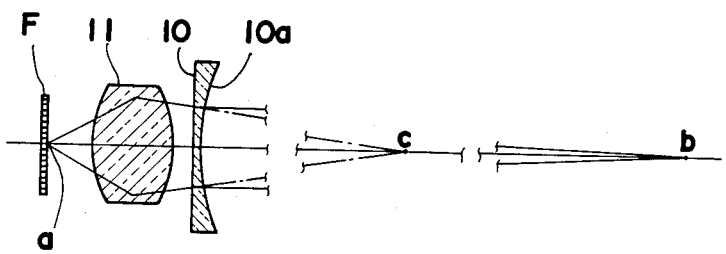
FIG. 4 is a diagram for illustrating the principle of the invention.

The object distances employed when the camera 1 described above is in air and in water are illustrated in FIG. 4. The principle and the operation of the embodiment are illustrated also by referring to FIG. 4. For simplicity, the body of the camera and the film cartridge are omitted, and the main elements 11 of the optical system for photographing is shown as a single lens. When the camera 1 is placed on land, it is now assumed that a subject located at a point b is in focus. At this time, the front surface 10a of the glass member 10 is in contact with the air. Under this condition, the light from the point b enters the glass member 10, where it is once caused to diverge. Then, the light is converged by the main elements 11 and brought to focus at a point a on the film F. Under this condition, if the camera 1 is put into water, the front surface 10a of the glass member 10 comes into contact with water. As a result, the degree of refraction of the light entering the glass member 10 through the concave front surface 10a is changed because of the difference between the indices of refraction of air and water. That is, the index of refraction of air is equal to 1, while that of water is approximately 1.33. Hence, the light impinging upon the glass is refracted to a lesser extent in water than on land. Thus, in water the light coming from a point c at a shorter distance than the point b is brought to focus at the point a on the film F, as shown in FIG. 4, in spite of exactly the same condition as the foregoing case on land.

Therefore, if the curvature of the front surface 10a of the glass member 10 is appropriately selected in designing the optical system for photographing, the optical system can be focused at a predetermined object distance for photographing on land when the camera is used on land and at a shorter object predetermined distance for photographing in water when the camera is used in water. The minimum photographable distance that is determined by the depth of field of the lens assumes a smaller value in water than on land, allowing shorter distance photographing in water.

In the above example, the present invention is applied to a camera using a disklike film cartridge. Obviously, the invention can also be applied to other kind of cameras, such as a 35-mm camera or 110-format camera, or other form of camera. Also, the transparent optical member may be made from plastic rather than glass.

What is claimed is:

1. An amphibious camera comprising:
   a camera casing having a front wall formed with an opening and waterproofed except for said opening;
   a focusing optical system including a front element having a concave front surface and said system as a whole has a positive power so as to focus on an object; and
   means for holding said front element in watertight register with said opening with said concave front surface interfacing with air and water when said camera is used on land and in water, respectively,
   wherein the curvature of said concave front surface is so selected that said focusing optical system focuses on a farther object at a first predetermined distance on land and on a closer object at a second predetermined distance in water, respectively, due to difference in the indices of refraction of air and water with which said concave front surface contacts, said first predetermined distance being longer than said second predetermined distance.

2. An amphibious camera as defined in claim 1, wherein said front element is formed as a lens having said concave front face.

* * * * *